United States Patent
Yamazaki et al.

(10) Patent No.: US 10,636,327 B2
(45) Date of Patent: Apr. 28, 2020

(54) DISPLAY MEDIUM

(71) Applicant: TOKIWA SANGYO CO., LTD., Sagamihara-shi, Kanagawa (JP)

(72) Inventors: Tatsuo Yamazaki, Sagamihara (JP); Hiroshi Kase, Sagamihara (JP); Naoto Abe, Sagamihara (JP)

(73) Assignee: TOKIWA SANGYO CO., LTD., Sagamihara-Shi (JP)

( * ) Notice: Subject to any disclaimer, the term of this patent is extended or adjusted under 35 U.S.C. 154(b) by 0 days.

(21) Appl. No.: 16/316,413

(22) PCT Filed: Aug. 31, 2016

(86) PCT No.: PCT/JP2016/075387
§ 371 (c)(1),
(2) Date: Jan. 9, 2019

(87) PCT Pub. No.: WO2018/042527
PCT Pub. Date: Mar. 8, 2018

(65) Prior Publication Data
US 2019/0251871 A1 Aug. 15, 2019

(51) Int. Cl.
| | | |
|---|---|---|
| *B32B 3/00* | (2006.01) | |
| *G09F 3/00* | (2006.01) | |
| *B65D 81/24* | (2006.01) | |
| *G01N 31/22* | (2006.01) | |
| *B65D 25/20* | (2006.01) | |
| *G09F 3/02* | (2006.01) | |
| *G01N 31/00* | (2006.01) | |

(52) U.S. Cl.
CPC ........... *G09F 3/0291* (2013.01); *B65D 25/20* (2013.01); *B65D 25/205* (2013.01); *B65D 81/24* (2013.01); *G01N 31/00* (2013.01); *G01N 31/22* (2013.01); *G01N 31/225* (2013.01); *G09F 3/02* (2013.01); *B65D 2203/02* (2013.01); *G09F 2003/0283* (2013.01)

(58) Field of Classification Search
CPC ..... G09F 3/0291; G01N 31/22; G01N 31/225
See application file for complete search history.

(56) References Cited

U.S. PATENT DOCUMENTS 4,349,509 A 9/1982 Yoshikawa et al.

FOREIGN PATENT DOCUMENTS

| JP | 56-8547 A | | 1/1981 |
|---|---|---|---|
| JP | 2001-124759 A | | 5/2001 |
| JP | 2007-183157 | * | 7/2007 |
| JP | 2007-183157 A | | 7/2007 |
| JP | 2008-69278 A | | 3/2008 |
| JP | 2009-107646 | * | 5/2009 |
| JP | 2009-107646 A | | 5/2009 |

* cited by examiner

*Primary Examiner* — Elizabeth E Mulvaney
(74) *Attorney, Agent, or Firm* — Birch, Stewart, Kolasch & Birch, LLP

(57) ABSTRACT

To provide a display medium that is discolored in a state of being exposed in the presence of oxygen. This display medium has a discoloration layer on a substrate, the discoloration layer being formed with a redox dye, a food dye, a reducing sugar, an edible reduction promoter, an edible moisturizer, and an oxygen detection composition that contains an edible thickener. The oxygen detection composition that forms the discoloration layer is reversibly discolored in accordance with the presence of oxygen, so that the discoloration layer changes color upon transition from an oxygen-free state to an oxygen-present state. Therefore, when the discoloration layer is formed with a letter, a drawing pattern, a symbol or the like, information relating to a commodity constituted by the letter, drawing pattern, symbol or the like is highlighted by discoloration.

20 Claims, No Drawings

DISPLAY MEDIUM

TECHNICAL FIELD

The present invention relates to a display medium, which is discolored in a state of being exposed in the presence of oxygen.

More specifically, the present invention relates to a display medium, wherein the discoloration layer which is formed of an oxygen detecting composition which reversibly changes color in response to the presence or absence of oxygen and constitutes information relating to a commodity constituted by the character, design, symbol or the like is discolored, so that the information is emphatically displayed.

BACKGROUND ART

In the distribution industry, a packaging material, card, poster, seal or label, which are for display, have been generally and widely used to display a commodity name, commodity content(s), manufacturer's name, selling price, or the like.

In addition, a label is known to be obtained by applying specific treatment to the card for display or the like so that character(s) or pattern(s) appears by discoloration under specific condition, has been known.

Such label is applied to, for example, a campaign label for informing only commodity purchaser about benefit information, a security label (alteration preventive label) capable of discriminating whether a commodity is opened, or the like.

For example, Japanese Patent Kokai Application Publication No. JP2013-210551A (Patent Document 1) proposes a plastic label capable of discoloring an arbitrary area of a label by a simple method that irradiates an uncured coating layer with an energy ray and suitable for a campaign label or a security label.

This plastic label comprises:

a label base material having at least thermal shrinkability and expandability; and a coating layer formed on at least one surface side of the label base material, wherein the coating layer is composed of an energy ray curable resin having an energy ray-curable functional group and a weight average molecular weight of 10000 to 100000, and at least a part of the resin is irradiated with energy rays to be cured and a part cured by the thermal shrinkage and expansion of the label base material is discolored.

In addition, Japanese Patent Kokai Application Publication No. JP2005-122068A (Patent Document 2) proposes an adhesive label for discriminating unsealing, which is used for sealing of various packages, and is capable of discriminating unsealing of a package at a glance when the adhesive label pasted to the package for sealing is cut and unsealed by a sharp edged cutting tool.

This adhesive label for discriminating unsealing, which is used for sealing of the package, is formed of a laminate, having at least a transparent oxygen barrier layer on an outer side, an independent island-like oxygen-detecting agent layer in an intermediate section, an oxygen-absorbing layer, an oxygen barrier layer on an inner side, an adhesive layer disposed on the back side of the oxygen barrier layer, and release paper.

The label is so constituted that, when the tacky adhesive label pasted for sealing the package is cut for the purpose of the unsealing, the independent island-like oxygen-detecting agent layer in the intermediate section is cut simultaneously.

PRIOR ART DOCUMENTS

Patent Documents

Patent Document 1: Japanese Patent Kokai Application Publication No. JP2013-210551A (Claims)

Patent Document 2: Japanese Patent Kokai Application Publication No. JP2005-122068A (Claims)

DISCLOSURE OF INVENTION

Technical Problem

However, with regard to the plastic label disclosed in Patent Document 1 above, there is a problem in that the step of energy ray irradiation is complicated in the method of curing the coating layer, which is formed by using an energy ray-curable resin, by the energy ray irradiation.

In the adhesive label for discriminating unsealing disclosed in Patent Document 2 above, the oxygen-detecting agent layer contained in the label contains components such as an organic solvent and a binder resin, and hence, when products directly contacting the human body, such as foods or pharmaceuticals, as contents are sealed within the packaging body, the products may come into contact with the oxygen-detecting agent layer, which is applied or printed to a surface of the adhesive label, and the adhesive label cannot be regarded as being sufficiently safe.

Under such circumstances, an object of the present invention is to provide a display medium capable of changing color upon transition from a sealed state of being sealed in the container or packaging body in an oxygen-free state to an unsealed state of being exposed in the presence of oxygen so as to emphatically display commodity information, such as a commodity name and commodity content(s), which has excellent safety and can be sealed in the packaging body containing foods, medical supplies, or the like at ease; and another object is to provide a packaging body in which the display medium is sealed.

Solution to Problem

That is, the present invention according to Claim 1 is characterized in, a display medium having a discoloration layer on a base material, wherein the discoloration layer changes color in response to the presence or absence of oxygen, and is formed of an oxygen detecting composition comprising an oxidation-reduction colorant, an edible colorant, a reducing sugar, an edible reduction promoter, an edible humectant, and an edible thickener, the oxidation-reduction colorant is comprised in an amount of 0.03 to 0.5 mass % based on the total amount of the composition, a compounding ratio of the oxidation-reduction colorant to the edible colorant is 1:0.5 to 1:1.5, and the edible thickener is comprised in an amount of 0.1 to 10 mass % based on the total amount of the composition.

The present invention according to Claim 2 is characterized in, the display medium according to Claim 1, wherein the discoloration layer forms at least one of character, design, and symbol.

The present invention according to Claim 3 is characterized in, the display medium according to Claim 1 or 2, wherein the oxygen detecting composition comprises an adhesive material.

The present invention according to Claim 4 is characterized in, the display medium according to Claim 3, wherein the adhesive material is polyvinyl alcohol resin.

The present invention according to Claim 5 is characterized in, the display medium according to any one of Claims 1 to 4, wherein the base material is constituted by an inkjet label base material.

The present invention according to Claim 6 is characterized in, the display medium according to any one of Claims 1 to 4, wherein the base material is constituted by CPP, PE or cellophane.

The present invention according to Claim 7 is characterized in, a packaging body, wherein the display medium according to any one of Claims 1 to 6 is sealed within the packaging body formed of a gas-barrier material.

Advantageous Effects of Invention

The display medium according to the present invention has a discoloration layer on a base material, and the discoloration layer is formed of an oxygen detecting composition containing an oxidation-reduction colorant, an edible colorant, a reducing sugar, an edible reduction promoter, an edible humectant, and an edible thickener.

In this display medium, the oxygen detecting composition forming the discoloration layer reversibly changes color in response to the presence or absence of oxygen, so that the discoloration layer is discolored upon transition from an oxygen-free state to an oxygen-present state.

Thus, when the discoloration layer is formed of character, design, symbol or the like, information relating to a commodity constituted by the character, design, symbol or the like, is emphatically displayed (indicated) by the discoloration.

The oxygen detecting composition, which forms the discoloration layer of the display medium, is composed of only edible components, which are permitted to be used for foods, pharmaceuticals, or raw materials therefor, thereby being safe to the human body.

In particular, the oxidation-reduction colorant is contained in an amount of 0.03 to 0.5 mass % based on the total amount of the composition, and a compounding ratio of the oxidation-reduction colorant to the edible colorant is 1:0.5 to 1:1.5, so that the display medium is safe to the human body, and better coloring property and discoloration property are provided when the display medium changes color.

In addition, the oxygen detecting composition contains the edible thickener in an amount of 0.1 to 10 mass % based on the total amount of the composition, so that better coloring property and discoloration property are provided, and color development and discoloration occur more quickly.

The oxygen detecting composition may contain an adhesive material, in particular, polyvinyl alcohol resin in order to obtain good adhesion or adhesiveness to the base material, in particular, the base material constituted by plastic.

The oxygen detecting composition may also be applied or printed to a material, such as CPP, PE or cellophane, or an inkjet label base material to form the discoloration layer.

In this case, since the oxygen detecting composition contains the thickener, better coloring property and discoloration property are provided, and color development and discoloration occur more quickly.

The display medium may be used in the form of being sealed within packaging body formed of a gas-barrier material.

DESCRIPTION OF EMBODIMENTS

Hereinafter, an embodiment of the display medium according to the present invention will be described.

Although the present invention is described mainly by preferred representative examples, it is to be understood that the present invention is not limited to such examples and that modifications can freely be made without departing from the spirit of the present invention.

A display medium according to the present invention has at least a discoloration layer on the base material thereof.

This discoloration layer is formed by an oxygen detecting composition which reversibly changes color in response to the presence or absence of oxygen.

Therefore, the discoloration layer also reversibly changes color in response to the presence or absence of oxygen.

The oxygen detecting composition used in the display medium contains an oxidation-reduction colorant, an edible colorant, a reducing sugar, an edible reduction promoter, an edible humectant, and an edible thickener.

The oxidation-reduction colorant selected is an aromatic compound including a long conjugated double bond system having $\pi$ electrons mobile in a molecule, which is a compound changing the color reversibly by oxidation-reduction.

Examples of such a compound include:

methylene blue, new methylene blue, neutral red, indigo carmine, acid red, safranine T, phenosafranine, Capri blue, Nile blue, diphenylamine, xylene cyanol, nitrodiphenylamine, ferroin, and N-phenylanthranilic acid.

The content of the oxidation-reduction colorant is preferably set in a range that does not affect the safety of the contents, in particular, a range that is selected such that LD50 (median lethal dose) is 1180 mg/kg or less.

Concretely, the content (contained amount) the oxidation-reduction colorant is 0.03 to 0.5 mass %, preferably 0.05 to 0.2 mass % based on the total amount of the composition.

The edible colorant has an edible property and is added to visually strongly recognize discoloration in the oxygen-present state through color mixture with the oxidation-reduction colorant.

The edible colorant is not particularly limited as long as it has an edible property, and can be appropriately selected from well-known synthetic edible colorants (food dyes) and natural edible colorants (food dyes).

Examples include food red dyes such as Food Red No. 2, Food Red No. 3, Food Red No. 40, Food Red No. 102, Food Red No. 104, Food Red No. 106, and natural cochineal dye; food yellow dyes such as Food Yellow No. 4, Food Yellow No. 5, and natural safflower yellow dye; and blue dyes such as Food Blue No. 1 and Food Blue No. 2.

One or more kinds of the above-described edible colorants may be arbitrarily mixed for use.

The compounding ratio of the oxidation-reduction colorant to the edible colorant is 1:0.5 to 1:1.5, preferably 1:1 to 1:1.5.

The reducing sugar has an edible property.

Examples of the reducing sugar include ascorbic acid, ascorbate, erythorbic acid, erythorbate, arabinose, erythritol, galactose, xylose, glucose, mannose, fructose, and lactose.

In this case, from the viewpoint of reducing power and solubility, it is preferred that fructose, in particular, D-fructose is selected.

The reducing sugar is incorporated in an amount of preferably 1 to 20 mass %, more preferably 3 to 10 mass % based on the total amount of the composition.

The reduction promoter to be used is not particularly limited as long as it has an edible property.

Examples include alkali agents such as sodium hydroxide, potassium hydroxide, sodium carbonate, and potassium carbonate.

The reduction promoter is incorporated in an amount of preferably 0.1 to 5 mass %, more preferably 0.5 to 3 mass % based on the total amount of the composition.

The humectant to be used is not particularly limited as long as it has an edible property.

Examples include glycerol and propylene glycol.

It is preferable that the humectant is incorporated in an amount of preferably 1 to 30 mass %, more preferably 5 to 10 mass % based on the total amount of the composition.

The thickener has an edible property and is added to obtain good and quick color development and discoloration to the base material, in particular, the base material constituted by paper.

Examples of the thickener include dextrin, carrageenan, agar, cellulose (such as hydroxypropyl methylcellulose), and sodium alginate.

The thickener is incorporated in an amount of 0.1 to 10 mass %, preferably 0.5 to 3 mass % based on the total amount of the composition.

In addition, the oxygen detecting composition may contain an adhesive material.

In the present invention, the adhesive material to be used may be edible adhesives, such as polyvinyl alcohol resin such as vinylformate resin, vinylacetate resin, and vinylpropionate resin.

The adhesive material selected is preferably vinylacetate resin used for a food additive.

When the adhesive material is added, good adhesion or adhesiveness is obtained to the base material, in particular, the base material constituted by plastic.

The adhesive material is incorporated in an amount of preferably 1 to 15 mass %, more preferably 2 to 10 mass % based on the total amount of the composition.

In the present invention, for example, in order to facilitate the application or print of the oxygen detecting composition, the oxygen detecting composition may be used in the form of being dissolved in a solvent, as needed.

The solvent to be used is not particularly limited as long as it has an edible property.

Examples of the solvent include water and ethanol.

Incidentally, when the water is added to the ethanol, the amount of the water to use is preferably in the range of 10 to 70 mass %, more preferably 35 to 55 mass % with respect to the ethanol.

Such an oxygen detecting composition forms a discoloration layer at the predetermined position on the base material through a well-known printing method or applying method, such as flexographic printing, gravure printing, offset printing, relief printing and screen printing.

The printing method selected is preferably flexographic printing because good printability is obtained.

In print or application, the discoloration layer may be constituted by patterns, such as character(s), design(s) or picture pattern(s), symbol, pattern(s) or marking(s).

According to such structure, the discoloration layer, in which information relating to a commodity formed of the character, design, symbol or the like is printed or applied, is discolored after specific time passes upon transition from an oxygen-free state to an oxygen-present state.

Thus, the information is emphatically displayed than before the discoloration.

For the base material, a general base material, such as paper, synthetic paper, nonwoven fabric and a synthetic resin film, can be used in accordance with the purpose and usage form.

The base material selected is preferably constituted by an inkjet label base material (a base material used for forming a label with an inkjet print head), polypropylene (CPP, OPP), polyethylene (PE), polyethylene terephthalate (PET), or cellophane because good coloring property and discoloration property are obtained, and color development and discoloration occur quickly due to an effect of the thickener contained in the oxygen detecting composition.

The shape of the base material selected is not particularly limited, and may be in a sheet shape, a film shape, or the like.

After the oxygen detecting composition is applied or printed to the base material, the surface of the base material may be overcoated by a well-known overcoating method to protect the surface.

In such an display medium, the color tone of the discoloration layer varies, for example, between an oxygen-free state of being sealed in the gas-barrier container with a deoxidizer and an oxygen-present state of being taken out from the container by unsealing, so that the discoloration layer, which constitutes information relating to a commodity formed of the character, design, symbol or the like, is emphasized when the discoloration layer is discolored upon transition from an oxygen-free to an oxygen-present.

Therefore, the display medium may be applied to, for example, a campaign label for informing only commodity purchaser about benefit information, a security label (alteration preventive label) capable of discriminating unsealing when a commodity is opened.

In this case, the display medium may be used in a form wherein the discoloration layer is formed on the base material, concretely, in a form wherein the discoloration layer is formed on the front surface or rear surface of inner bag, card, seal, or the like, which is sealed within packaging body formed of a gas-barrier material and containing contents such as foods and pharmaceuticals, and in addition, for example, in a form wherein the discoloration layer is formed on the inner surface of a packaging material, which constitutes packaging body containing contents such as foods and pharmaceuticals and is used for the base material.

EXAMPLES

Hereinafter, the present invention will be described in detail with reference to Examples; However, the present invention is not limited by these Examples.

Production Examples 1 and 2

According to the composition of the following Table 1, components was admixed and stirred to obtain oxygen detecting compositions.

TABLE 1

Composition of oxygen detecting composition (unit: mass %)

| Components | Ratio | | |
|---|---|---|---|
| | Production Example 1 | Production Example 2 | Production Example 3 |
| Methylene blue | 0.07 | 0.10 | 0.20 |
| Food Red No. 106 | 0.08 | 0.10 | 0.25 |
| Fructose | 7.00 | 5.00 | 10.00 |
| Sodium hydroxide | 1.50 | 2.00 | 3.00 |
| Glycerol | 5.00 | 7.00 | 10.00 |
| Ethanol | 40.42 | 52.00 | 38.90 |
| Hydroxypropylmethyl cellulose | 0.60 | 1.00 | 1.00 |
| Water | 45.33 | 32.80 | 36.65 |
| Total | 100.00 | 100.00 | 100.00 |

Examples 1 to 15

According to the following Production method based on the structure shown in the following Table 2, display mediums were prepared.

Production Method

On various base materials, the oxygen detecting composition obtained in Production Example 1 above was printed at a ratio of 4 g/m$^2$ with a flexographic printing machine (manufactured by MPS Systems B.V., EC330) to form a discoloration layer and then obtain sheet-shaped display medium having the discoloration layer.

TABLE 2

Various display mediums

| | Oxygen detecting composition | Base material |
|---|---|---|
| Example 1 | Production Example 1 | CPP sheet |
| Example 2 | Production Example 1 | OPP sheet |
| Example 3 | Production Example 1 | PE sheet |
| Example 4 | Production Example 1 | PET sheet |
| Example 5 | Production Example 1 | Cellophane sheet |
| Example 6 | Production Example 2 | CPP sheet |
| Example 7 | Production Example 2 | OPP sheet |
| Example 8 | Production Example 2 | PE sheet |
| Example 9 | Production Example 2 | PET sheet |
| Example 10 | Production Example 2 | Cellophane sheet |
| Example 11 | Production Example 3 | CPP sheet |
| Example 12 | Production Example 3 | OPP sheet |
| Example 13 | Production Example 3 | PE sheet |
| Example 14 | Production Example 3 | PET sheet |
| Example 15 | Production Example 3 | Cellophane sheet |

Test Example 1 Evaluation of Discoloration Property

The display mediums obtained in Examples 1 to 15 above were subjected to a discoloration test in accordance with the following measurement method.
The results are shown in Table 3.

Test Method

The display medium was placed into a gas-barrier transparent container. The container was purged with nitrogen, and subsequently sealed and preserved at a temperature of 25° C. A color change of the discoloration layer was visually observed after a few hours.

After the observation, the display medium was taken out from the container. A color change of the discoloration layer was visually observed after a few hours.

TABLE 3

Color of discoloration layer

| | Before sealing and preservation | After the passage of a few hours after sealing and preservation | After the passage of a few hours after unsealing |
|---|---|---|---|
| Example 1 | blue-violet | red | blue-violet |
| Example 2 | blue-violet | red | blue-violet |
| Example 3 | blue-violet | red | blue-violet |
| Example 4 | blue-violet | red | blue-violet |
| Example 5 | blue-violet | red | blue-violet |
| Example 6 | blue-violet | red | blue-violet |
| Example 7 | blue-violet | red | blue-violet |
| Example 8 | blue-violet | red | blue-violet |
| Example 9 | blue-violet | red | blue-violet |
| Example 10 | blue-violet | red | blue-violet |
| Example 11 | blue-violet | red | blue-violet |
| Example 12 | blue-violet | red | blue-violet |
| Example 13 | blue-violet | red | blue-violet |
| Example 14 | blue-violet | red | blue-violet |
| Example 15 | blue-violet | red | blue-violet |

Results

The color of all of the display mediums thus obtained changed from blue-violet to red after a few hours since they had been sealed and preserved.

When the container was opened, the display mediums were returned to blue-violet after a few hours.

As described above, apparently, the display mediums according to the present invention have an effect of being discolored in an oxygen-present state after unsealing to emphatically display information or the like relating to a commodity formed of the design, symbol or the like even though the discoloration layer thereof are composed of the edible components, which is safe to the human body.

Production Examples 4 to 6

According to the composition of the following Table 4, components were admixed and stirred to obtain oxygen detecting compositions.

TABLE 4

Composition of oxygen detecting composition (unit: mass %)

| Components | Ratio | | |
|---|---|---|---|
| | Production Example 4 | Production Example 5 | Production Example 6 |
| Methylene blue | 0.07 | 0.10 | 0.20 |
| Food Red No. 106 | 0.08 | 0.10 | 0.25 |
| Fructose | 7.00 | 5.00 | 10.00 |
| Sodium hydroxide | 1.50 | 2.00 | 3.00 |
| Glycerol | 5.00 | 7.00 | 10.00 |
| Ethanol | 40.42 | 52.00 | 38.90 |
| Hydroxypropylmethyl cellulose | 0.60 | 1.00 | 1.00 |
| Vinyl acetate resin | 2.00 | 5.00 | 10.00 |
| Water | 43.33 | 27.80 | 26.65 |
| Total | 100.00 | 100.00 | 100.00 |

Examples 16 to 24

The display mediums were obtained in the manner as in Example 1 other than being based on the structure shown in following Table 5.

TABLE 5

Various display mediums

| | Oxygen detecting composition | Base material |
|---|---|---|
| Example 16 | Production Example 4 | CPP sheet |
| Example 17 | Production Example 4 | PE sheet |
| Example 18 | Production Example 4 | Cellophane sheet |
| Example 19 | Production Example 5 | CPP sheet |
| Example 20 | Production Example 5 | PE sheet |
| Example 21 | Production Example 5 | Cellophane sheet |
| Example 22 | Production Example 6 | CPP sheet |
| Example 23 | Production Example 6 | PE sheet |
| Example 24 | Production Example 6 | Cellophane sheet |

Test Example 2 Evaluation of Discoloration Property

The display mediums obtained in Examples 16 to 24 above were subjected to a discoloration test in accordance with the manner as in Test Example 1.
The results are shown in Table 6.

TABLE 6

Color of discoloration layer

| | Before sealing and preservation | After the passage of a few hours after sealing and preservation | After the passage of a few hours after unsealing |
|---|---|---|---|
| Example 16 | blue-violet | red | blue-violet |
| Example 17 | blue-violet | red | blue-violet |
| Example 18 | blue-violet | red | blue-violet |
| Example 19 | blue-violet | red | blue-violet |
| Example 20 | blue-violet | red | blue-violet |
| Example 21 | blue-violet | red | blue-violet |
| Example 22 | blue-violet | red | blue-violet |
| Example 23 | blue-violet | red | blue-violet |
| Example 24 | blue-violet | red | blue-violet |

Results

The color of all of the display mediums thus obtained changed from blue-violet to red after a few hours since they had been sealed and preserved.

When the container was opened, the display mediums were returned to blue-violet after a few hours.

As described above, apparently, the display mediums according to the present invention have an effect of being discolored in an oxygen-present state after unsealing to emphatically display information or the like relating to a commodity formed of the design, symbol or the like even though the discoloration layer thereof are composed of the edible components, which is safe to the human body.

Test Example 3 Evaluation of Discoloration Property

The oxygen detecting composition obtained in Production Example 1 above was printed to a paper (manufactured by Fuji Xerox Corporation, V-paper, weight: 64 g/m$^2$) as character and design to obtain the display medium. The display medium thus obtained was sealed in a gas-barrier packaging body with a deoxidizer. A color change of the discoloration layer was visually observed after a few hours.

After the observation, the display medium was taken out from the packaging body. A color change of the discoloration layer was visually observed after a few hours.

Results

The character and design, which were printed on the surface of the display mediums, changed from blue-violet to red after a few hours since they had been sealed.

When the packaging body was opened, the display mediums were returned to blue-violet after a few hours.

As described above, apparently, the display mediums according to the present invention have an effect that the discoloration layer thereof is discolored when the display mediums are taken out from a sealed gas-barrier packaging body to expose to oxygen, so that information or the like relating to a commodity formed of the design, symbol or the like is emphatically displayed.

INDUSTRIAL APPLICABILITY

The display medium according to the present invention enables to display character, design, symbol, or the like, which shows commodity information such as a commodity name and commodity content(s) so that the character, design, symbol, or the like can be visually strongly recognized by changing color upon transition from a sealed state of being sealed in the container or packaging body in an oxygen-free state to an unsealed state of being exposed in the presence of oxygen.

In addition, since the oxygen detecting composition, which constitutes the discoloration layer of the display medium, is safe to the human body due to comprising edible components only, it can be sealed in the packaging body containing foods, medical supplies or the like at ease.

Thus, the present invention is probably applied to an industry of producing or handling packaging body containing foods, medical supplies or the like.

The invention claimed is:

1. A display medium having a discoloration layer on a base material,
    wherein the discoloration layer changes color in response to the presence or absence of oxygen, and is formed of an oxygen detecting composition comprising an oxidation-reduction colorant, an edible colorant, a reducing sugar, an edible reduction promoter, an edible humectant, an edible thickener, and an adhesive material,
    the oxidation-reduction colorant is comprised in an amount of 0.03 to 0.5 mass % based on the total amount of the composition,
    a compounding ratio of the oxidation-reduction colorant to the edible colorant is 1:0.5 to 1:1.5,
    the edible thickener is comprised in an amount of 0.1 to 10 mass % based on the total amount of the composition, and
    the base material is constituted by plastic.

2. The display medium according to claim 1, wherein the discoloration layer forms at least one of character, design, and symbol.

3. The display medium according to claim 1, wherein the adhesive material is polyvinyl alcohol resin.

4. The display medium according to claim 1, wherein the adhesive material is vinylacetate resin.

5. The display medium according to claim 1, wherein the base material is constituted by an inkjet label base material.

6. The display medium according to claim 1, wherein the base material is constituted by CPP, PE or cellophane.

7. A packaging body, wherein the display medium according to claim 1 is sealed within the packaging body formed of a gas-barrier material.

8. The display medium according to claim 2, wherein the adhesive material is polyvinyl alcohol resin.

9. The display medium according to claim 2, wherein the adhesive material is vinylacetate resin.

10. The display medium according to claim 2, wherein the base material is constituted by an inkjet label base material.

11. The display medium according to claim 3, wherein the base material is constituted by an inkjet label base material.

12. The display medium according to claim 4, wherein the base material is constituted by an inkjet label base material.

13. The display medium according to claim 2, wherein the base material is constituted by CPP, PE or cellophane.

14. The display medium according to claim 3, wherein the base material is constituted by CPP, PE or cellophane.

15. The display medium according to claim 4, wherein the base material is constituted by CPP, PE or cellophane.

16. A packaging body, wherein the display medium according to claim 2 is sealed within the packaging body formed of a gas-barrier material.

17. A packaging body, wherein the display medium according to claim 3 is sealed within the packaging body formed of a gas-barrier material.

18. A packaging body, wherein the display medium according to claim 4 is sealed within the packaging body formed of a gas-barrier material.

19. A packaging body, wherein the display medium according to claim 5 is sealed within the packaging body formed of a gas-barrier material.

20. A packaging body, wherein the display medium according to claim 6 is sealed within the packaging body formed of a gas-barrier material.

* * * * *